C. HEBBELER.
FILTER.
APPLICATION FILED FEB. 10, 1909.
949,357.
Patented Feb. 15, 1910.
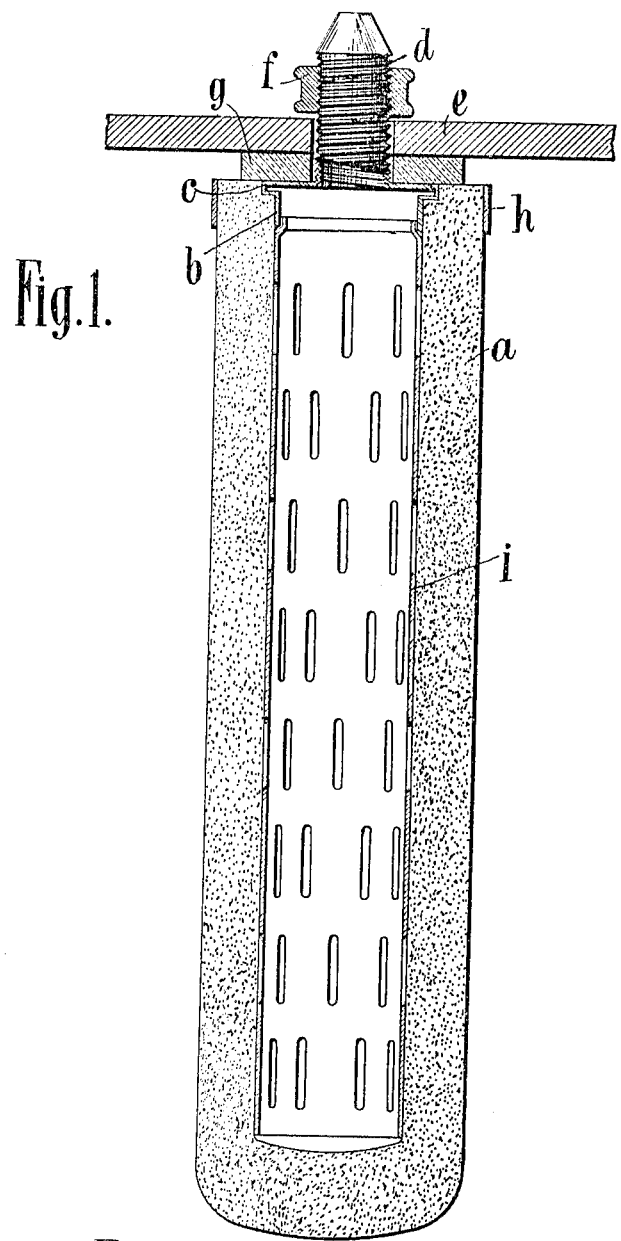
Fig.1.
Fig.2.
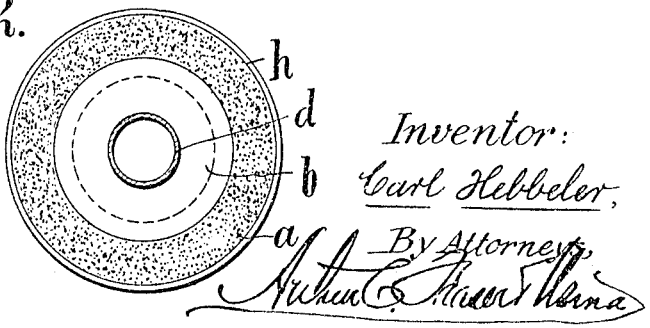
Witnesses:
Fred White
René Paine
Inventor:
Carl Hebbeler,
By Attorneys,

UNITED STATES PATENT OFFICE.

CARL HEBBELER, OF CELLE, GERMANY, ASSIGNOR TO BERKEFELD FILTER GESELLSCHAFT G. M. B. H., OF CELLE, GERMANY.

FILTER.

949,357.  Specification of Letters Patent.  Patented Feb. 15, 1910.

Application filed February 10, 1909. Serial No. 477,154.

*To all whom it may concern:*

Be it known that I, CARL HEBBELER, a subject of the King of Prussia, residing in Celle, Germany, have invented certain new and useful Improvements in Filters, of which the following is a specification.

The invention relates to a means of fastening filtering bodies of porous material in or upon a metal frame or receptacle. In effecting such a fastening it has been customary to cement the usual cylindrical filtering body in a metal shell which extended over the outside of the filter body at one end. The shell has had thus an inner cross-section corresponding to the outer cross-section of the filter body. With this arrangement there has existed a cement joint running around the filter body. This joint has been a defective point in previous filters.

The use of a filter body made of a porous mass has an especial advantage over the use of loose filtering material, in that by making the pores fine enough a completely germ-free filtrate can be obtained. This, however, is only possible so long as the cement joint between the filter body and the metal shell is tight. It appears, however, that a lasting tightness of the cement joint cannot be obtained with the customary arrangement above referred to. Every effort to secure such a result has been unsuccessful. The special reason for the lack of tightness of the joint apparently lies in the fact that the metal shell, the hardened, completely tight cement, and the porous mass, have different coefficients of expansion; and this causes fine cracks in the cement under temperature changes such as occur, especially in the repeated warming of the filter for the purpose of sterilization, and which cracks form passages for the germs. The fastening of the present invention eliminates this disadvantage by avoiding the cement joint, and by a corresponding change in the metal parts which are to be connected with the filter body, the novel features being stated in the claims hereinafter.

The drawings show the principal parts of a filter fastened in a frame or chamber according to the present invention.

Figure 1 is a vertical section, and Fig. 2 is a plan showing the face of the filter body.

Referring to the embodiment of the invention illustrated, the filter body $a$ has the form of a cylinder closed at one end. In the open end there is cemented a metal shell $b$ whose outer diameter corresponds to the inner diameter of the filter cylinder. For greater security of fastening, the shell can be provided with an expanded portion $c$ which engages in a corresponding rabbet in the edge of the filter body in such a way that the shell at the top is level with the top face of the filter body.

The shell $b$ is provided with an outlet tube $d$ which has an outside screwthread serving for connecting the filter with the frame or wall $e$ thereof by means of a nut $f$ screwed on the tube $d$.

Between the upper face of the filter body and the wall $e$ there is located a packing ring $g$ of rubber or the like which not only packs tightly the passage in the wall $e$ through which the tube $d$ passes, but also covers and secures perfectly tight the cement joint between the shell $b$ and the filter body $a$, so that this cement joint even if badly made or if injured by use, cannot permit the passage of germs.

With the arrangement of this invention, a cement joint may be omitted.

Around the open end of the filter body there is arranged an outside ring $h$ which tends to prevent a springing of the filter body when the nut $f$ is screwed up hard, and also to prevent the breaking of the edge of the filter body.

There can be provided in connection with the shell $b$, a tube $i$ as shown and provided with perforations, said tube reaching to the bottom of the filter body and stiffening it against any outward force. With this arrangement of the tube there is avoided a second cement joint on the filter body such as has been provided with previous arrangements.

What I claim is:

1. In combination, a filter body, and a metal head piece attached to said body, said head piece having a top portion which is level with the top face of the filter body, and a packing ring overlying the joint between the head piece and the body.

2. In combination, a filter body, a metal head piece entering into the mouth of the same, and a packing ring overlying the joint between the head piece and the body.

3. In combination, a filter body $a$, in combination with a head piece entering into said body, a tube $d$ connected with said head piece, and a packing ring $g$ overlying the joint between the body and the head piece.

In witness whereof, I have hereunto signed my name in the presence of two subscribing witnesses.

CARL HEBBELER.

Witnesses:
 LOUISE KATHOR,
 J. M. BOWCOCK.